Dec. 20, 1960 J. L. D. MORRISON ET AL 2,964,958

LOW RUMBLE MOTOR ASSEMBLY

Filed Feb. 6, 1959 2 Sheets-Sheet 1

INVENTORS.
JAMES L. D. MORRISON.
MICHAEL H. ESTKOWSKI.
BY
Lockwood, Woodard, Smith & Weikart.
ATTORNEYS.

Dec. 20, 1960 J. L. D. MORRISON ET AL 2,964,958

LOW RUMBLE MOTOR ASSEMBLY

Filed Feb. 6, 1959 2 Sheets-Sheet 2

INVENTORS.
JAMES L. D. MORRISON.
MICHAEL H. ESTKOWSKI.
BY
Lockwood, Woodard, Smith & Weikart.
ATTORNEYS.

2,964,958

LOW RUMBLE MOTOR ASSEMBLY

James L. D. Morrison and Michael H. Estkowski, both of 7551 Melrose Ave., Room 9, Hollywood, Calif.

Filed Feb. 6, 1959, Ser. No. 791,625

11 Claims. (Cl. 74—199)

This invention relates generally to drive means for phonograph turntables and in particular to a drive means wherein the turntable drive system is vibrationally isolated from the motor drive shaft.

In even the more expensive phonograph turntable drive motors the armatures are invariably at least somewhat out of dynamic balance and therefore vibrate when in rotation. When these vibrations are picked up by the record player cartridge they produce an undesirab'e audio effect referred to as rumble. Another source of rumble is the attracting forces resulting from the magnetic field produced by the motor stator windings and laminations. Conventional attempts to minimize rumble from these sources involves attaching the motor to the record player by means of resilient mountings and the use of magnetic shielding on the motor to reduce the magnetic vibratory forces. In these conventional assemblies, however, the motor shaft directly contacts some type of speed reducing member which, in turn, directly contacts the turntable. Vibration of the motor armature is thus transmitted directly to the turntable.

The popu!arity of high fidelity audio systems and stereophonic sound reproduction has aggravated the problem of minimizing rumble. In pickup cartridges for use with monaural records vertical compliance of the cartridge stylus may be low and rumble, therefore, must be held low in only one plane, the plane of the record itself. Since stereo cartridges pick up exciting forces in planes both parallel to, and normal to, the p!ane of the record, use of stereophonic records has required that the transfer of vibrations in both planes be minimized.

It is an object of the present invention to provide a low rumble motor assembly which, when coupled to the turntable drive system for a record player, minimizes the transmission of motor vibrations to the turntable in planes both normal to and parallel with the turntable axis.

A further object of the present invention is to provide a low rumble motor assembly wherein the motor mounting plate is formed so as to magneticai!y shield the motor and to space the motor from the record player base whereby magnetically induced vibratory forces are minimized.

A further object of the present invention is to provide a low rumble motor assembly adapted for mounting on a record player wherein the motor assembly is suspended on the player base by a three-point resilient mounting with the motor shaft being vibrationally isolated from the turntable of the record player.

A further object of the present invention is to provide a low rumble motor assembly adapted to be coupled to the turntable drive system for a record player in which all members moving at relatively high rotational speeds are vibrationally isolated from the turntable of the record player without adversely affecting the transfer of torque from the motor to the turntable.

The full nature of the invention will be understood from the accompanying drawing and the following description and claims:

Figure 1:
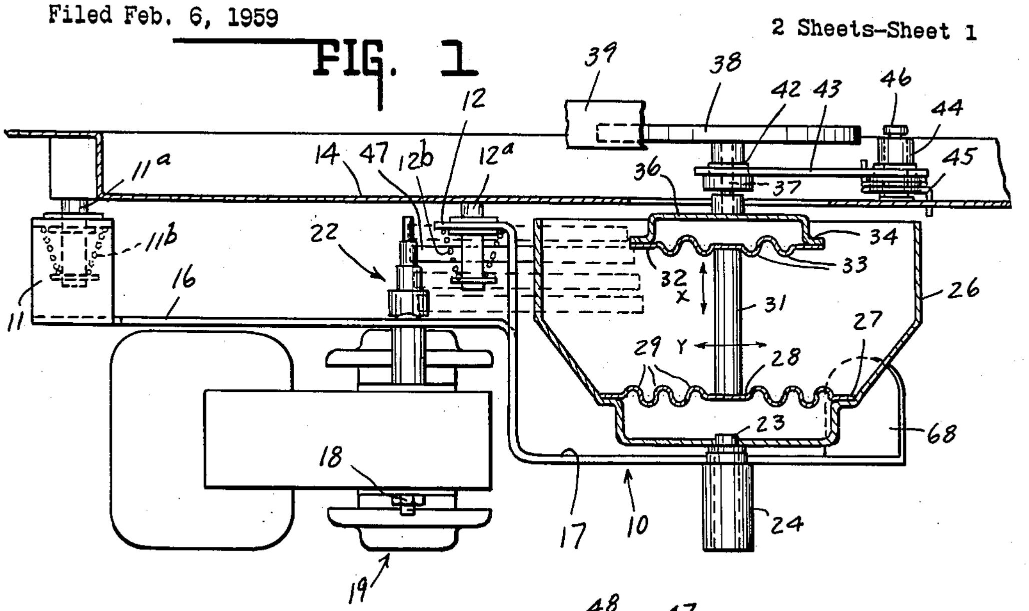
Fig. 1 is a side, sectional view of a motor assembly embodying the present invention.
Figure 2:
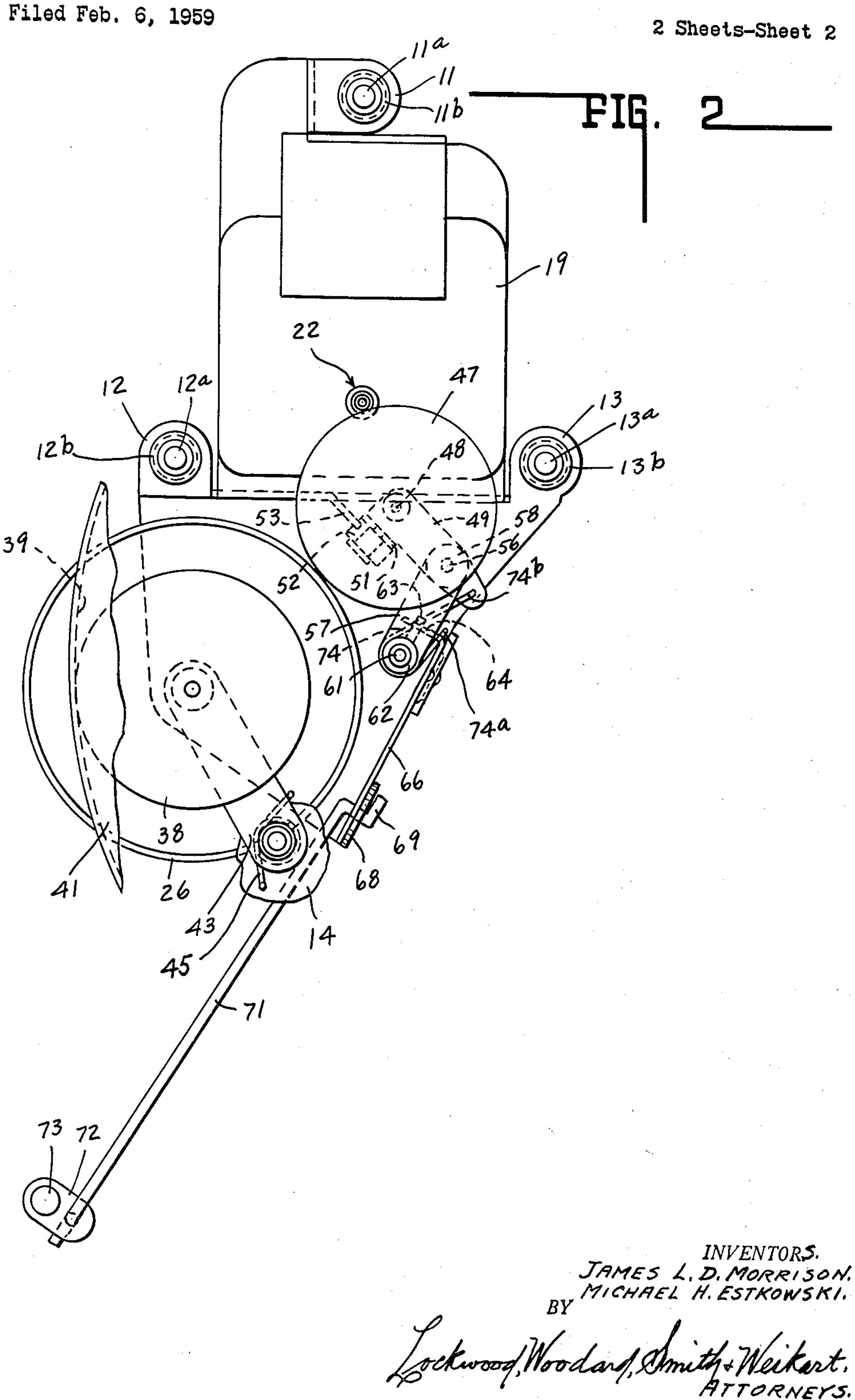
Fig. 2 is a fragmentary, top view of the assembly shown in Fig. 1 with the base plate broken away.

Referring initially to Figs. 1 and 2, the motor assembly includes a motor mounting plate indicated generally at 10 having offset mounting tabs 11, 12 and 13. These tabs are apertured to freely accommodate mounting posts 11*a*, 12*a* and 13*a* which extend from a dished record changer base p'ate 14. Conical compression springs 11*b*, 12*b* and 13*b*, bottomed on the tabs and upon retainers carried by posts, provide a resilient support or suspension for the mounting plate 10.

The mounting plate is formed to provide a first plane surface 16 and a second plane surface 17 offset outwardly from the changer base plate. Mounted by means of through bolts 18 on the surface 16 of the mounting plate is a conventional turntable drive motor 19 having a drive shaft extending through the mounting plate and into the space between the mounting plate 10 and the changer base plate 14. The extending end of the shaft carries a stepped drive member 22 which is adapted to be contacted by a drive wheel to be subsequently described.

The plane surface 17 formed by the mounting plate carries a stub shaft 23, supported for rotation on the mounting plate by the bearing member 24. Rotatably locked to the shaft 23 is a first cup-shaped member or wheel 26 having an internal shoulder 27 formed therein. Rigidly secured to the shoulder 27 and extending across the member 26 is a flexible diaphragm 28 having a series of concentric corrugations 29 formed therein. The diaphragm may be formed of relatively flexible material, such as beryllium copper or the like. It will be apparent that because of the relatively thin cross section of the diaphragm and because of the concentric corrugations therein, it will have appreciable resistance only to shearing stress applied in a direction transverse to the axis of rotation of the shaft 23 and the cup-shaped member 26, and will readily flex in other directions.

Rigidly secured to the central flat portion of the membrane or diaphragm 28, is a member 31 which functions as a rigid, torque transmitting element. The opposite end of the member 31 is rigidly secured to the central portion of a second flexible diaphragm 32 which is somewhat smaller in dimension than the diaphragm 28 and also has a series of concentric corrugations 33 therein.

The peripheral portion of the diaphragm 32 is rigidly secured to the outwardly extending flange 34 formed on the second cup-shaped member 36. Axially extending from the closed end of the cup-shaped member 36 is a drive shaft 37, carrying at its outer end a drive wheel 38. The drive wheel is of conventional form and its peripheral edge may be provided with an antifriction, rubber facing adapted to engage the inner face of the marginal flange 39 of a conventional record player turntable 41 (Fig. 2).

The drive wheel or idler 38 is pivoted on the changer base by means of an arm 43 which in turn carries a bearing member 42 for supporting the shaft 37. The opposite end of the arm 43 is pivotally supported by means of a bearing member 44 on a post 46 extending from the changer base plate 14. A torsion spring 45 acts on the arm 43 to urge the drive wheel 38 against the turntable flange 39. As will be evident from Fig. 1, the shaft 37 extends through an enlarged aperture in the base plate 14 and the drive wheel 38 is thus free for limited movement in a direction normal to the axis of rotation of the drive wheel.

Referring now to Fig. 1, the speed changing mechanism will now be described, this mechanism including an idler wheel 47 which is positioned so that its periphery engages one or the other of the stepped portions of the drive member 22 and the outer face of the cup-shaped member 26. The idler 47 is rotatably supported on a shaft 48 which is carried by an L-shaped lever 49. As will be evident from Figs. 2 and 3, one end of the lever 49 carries a downturned tab 51 which rotatably supports a roller 52. The roller is adapted to be positively engaged by the edge of the idler pull-away cam 53 stuck from the portion of the mounting plate 10 which joins the plane surfaces 16 and 17. As may best be seen in Fig. 3, the edge of the cam 53 has a series of depressions 54 formed therein into which the roller 52 is selectively seated.

Intermediate its ends the lever 49 is pivoted on a shaft 56 which extends upwardly from an offset lever 57, the spacer 58 serving to space the lever 49 from the lever 57. The opposite end of lever 57 is apertured to rigidly accommodate a sleeve 59. The sleeve 59 is slidably received upon a post 61 which extends from the motor mounting plate surface 17.

The adjacent face of the lever 57 engages a sliding bearing 62 also accommodated on the post 61. A pin 63 extends from the bearing 62 and extends through the slotted end 64 of an L-shaped lever 66. The lever 66 is pivoted at 67 on a tab 68 struck from the surface 17 of the motor mounting plate 10. The end of the upper leg of the lever 66 is apertured to pivotally receive the transverse portion of the offset end 69 of a speed shift control member 71. As may be seen in Fig. 2, the member 71 extends into pivotal engagement with a link 72 moved by a shaft 73 to which may be attached a speed shift control knob (not shown).

As shown in Fig. 2, a torsion spring 74 encircles the post 61 and has one leg 74*a* engaging the adjacent end of the lever 66 and its other leg 74*b* hooked into a suitable aperture formed in the end portion of the lever 49. The spring 74 thus serves to bias the lever 49 into a position such that the roller 52 is maintained in engagement with the pull-away cam 53. It will thus be evident that with the roller 52 seated in one or the other of the depressions 54 formed in the cam 53, the speed reducing idler 47 will be engaged with and transfer rotary motion between the cup-shaped member 26 and the selected one of the stepped portions of drive member 22.

Figure 4:
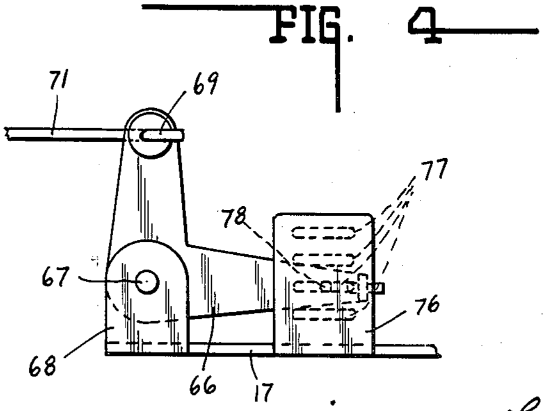
Fig. 4 is a fragmentary side view of a portion of the apparatus shown in Fig. 2.

Referring to Fig. 4, a detent means is provided for locating the lever 66 in any one of a series of positions. This detent means includes a plate 76 extending from the surface 17 of the motor mounting plate and provided with spaced elongated depressions 77. The major leg of the lever 66 is provided with a dimple or abutment 78 which is adapted to seat within one or the other of the depressions 77. Thus, as the member 71 is moved linearly, the position of lever 66 may be changed to any one of the positions defined by seating of the abutment 78 in the selected one of the depressions 77.

Figure 3:
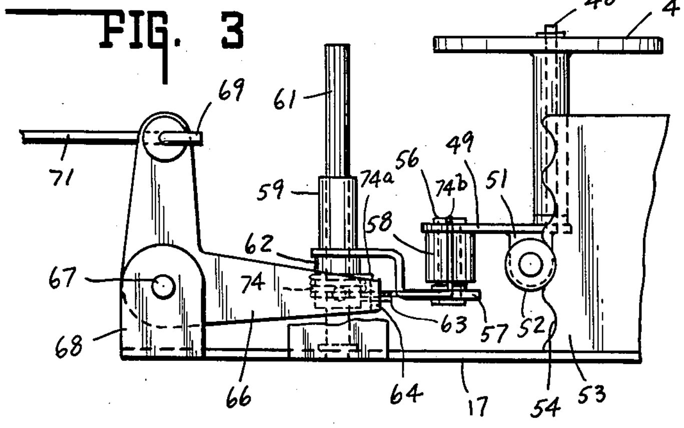
Fig. 3 is a detailed side view of a portion of the apparatus shown in Fig. 2.

In operation, with the speed shift control knob adjusted so that the lever 66 is in the positions shown in Figs. 3 and 4, the idler 47 will be in engagement with the second smallest of the stepped portions of the drive member 22, that is, in its solid line position of Fig. 1. When in this position, the record player turntable will be rotated at the conventional 33⅓ r.p.m. Rotary motion of the motor shaft is transmitted through the idler 47 to the cup-shaped member 26. Rotation of the cup-shaped member is transferred through the diaphragms 28 and 32 and the member 31 to the shaft 37. Engagement of the drive wheel 38 with the turntable flange produces rotation of the turntable at the designated speed. Changing the speed of rotation of the turntable may be accomplished by moving the speed shift control knob to displace the lever 66 and consequently the lever 57. During this movement, the roller 52 will ride over the adjacent land in the cam 53, thereby momentarily swinging the lever 49 clockwise, as viewed in Fig. 2. This clockwise movement of lever 49 momentarily disengages the idler 47 from the drive member 22 and from the outer face of the cup-shaped member 26. During the displacement of the idler it is thus cammed out of engagement with both the driving member 22 and the driven cup-shaped member 26. When the roller 52 again seats within the selected depression in the cam 53, the idler will again be positioned in contact with the driving member 22 and the cup-shaped member 26.

Since both diaphragms 28 and 32 are quite flexible in the direction indicated at *x* in Fig. 1, it will be evident that any vibration in this direction will be isolated from the drive wheel 38 and consequently from the record player turntable 41. Because of the corrugations 29 and 33 in the diaphragms 28 and 32, respectively, any vibration in the direction indicated at *y* will be absorbed and will not be transmitted to the drive wheel 38. Thus, any motor vibrations, caused by dynamic unbalance of the motor armature, will not be transmitted to the drive wheel 38 and the turntable 41. The turntable drive system, including the drive wheel 38, rather than directly contacting the drive member 22, as is conventional, is driven through a flexible coupling provided by the diaphragms 28 and 33. This flexible coupling does not adversely affect the transmission of torque from the drive member 22 to the drive wheel 38 since the diaphragms 28 and 32 are quite resistant to shearing stress applied in a direction transverse to their axis of rotation.

The arrangement whereby the motor 19 is mounted at a different level on the mounting plate from that at which the cup-shaped member 26 is mounted serves to magnetically shield the motor and minimize the vibrational forces originating as a result of the magnetic field set up by the motor windings.

The invention claimed is:

1. A low rumble motor assembly adapted to drive the turntable of a record player comprising a motor mounting plate having a multi-point resilient suspension from a supporting surface, said plate being formed to provide a first plane surface spaced from said supporting surface and a second plane surface spaced a further distance from said supporting surface, a drive motor mounted on the outer face of said first plane surface and having its shaft extending from the inner face thereof, a stepped drive member carried on the extending portion of said motor shaft, a cup-shaped member having its closed end disposed adjacent the inner face of said second plane surface and mounted for axial rotation thereon, a first flexible diaphragm having a series of concentric corrugations therein supported within said cup-shaped member and disposed normal to the axis of said member, a rigid torque-transmitting member extending centrally from said first diaphragm, a second flexible diaphragm having a series of concentric corrugations therein attached to said torque transmitting member, drive wheel supporting means carried by said second diaphragm, a drive wheel carried by said supporting means and adapted to have driving engagement with the record player turntable, a speed reducing idler wheel mounted for rotary and axial movement on said motor plate and adapted to simultaneously engage one or the other of the stepped portions of said stepped drive member and said cup-shaped member, and turntable speed changing means for shifting the axial position of said idler wheel, whereby torque is transmitted from said motor drive shaft to said drive wheel with said diaphragms functioning to isolate said drive wheel from vibration both parallel to and transverse to the axis of rotation of said cup-shaped member.

2. A low rumble motor assembly adapted to drive the turntable of a record player comprising a motor mounting plate having a multi-point resilient suspension from a supporting surface, a drive motor mounted on the outer face of said plate and having its shaft extending from the inner face thereof, a stepped drive member carried on the extending portion of said motor shaft, a cup-shaped member having its closed end disposed adjacent the inner face of said plate and mounted for axial rotation thereon, a first flexible diaphragm supported within said cup-shaped member and disposed normal to the axis of said member, a rigid torque-transmitting member extending centrally from said first diaphragm, a second flexible diaphragm attached to said torque transmitting member, a drive wheel supporting means carried by said second diaphragm, a drive wheel carried by said supporting means and adapted to have driving engagement with the record player turntable, a speed reducing idler wheel mounted for rotary and axial movement on said motor plate and adapted to simultaneously engage one or the other of the stepped portions of said stepped drive member and said cup-shaped member, and turntable speed changing means for shifting the axial position of said idler wheel, whereby torque is transmitted from said motor drive shaft to said drive wheel with said diaphragms functioning to isolate said drive wheel from vibration both parallel to and transverse to the axis of rotation of said cup-shaped member.

3. A low rumble motor assembly adapted to drive the turntable of a record player comprising a motor mounting plate having a multi-point resilient suspension from a supporting surface, a drive motor mounted on the outer face of said plate and having its shaft extending from the inner face thereof, a stepped drive member carried on the extending portion of said motor shaft, a diaphragm support member disposed adjacent the inner face of said plate and mounted for rotation thereon, a first flexible diaphragm supported by said diaphragm support member and disposed normal to the axis of rotation of said member, a rigid torque-transmitting member extending centrally from said first diaphragm, a second flexible diaphragm attached to said torque transmitting member, drive wheel supporting means carried by said second diaphragm, a drive wheel carried by said supporting means and adapted to have driving engagement with the record player turntable, a speed reducing idler wheel mounted for rotary and axial movement on said motor plate and adapted to simultaneously engage one or the other of the stepped portions of said stepped drive member and said diaphragm support member, and turntable speed changing means for shifting the axial position of said idler wheel, whereby torque is transmitted from said motor drive shaft to said drive wheel with said diaphragms functioning to isolate said drive wheel from vibration both parallel to and transverse to the axis of rotation of said diaphragm support member.

4. A low rumble motor assembly adapted to drive the turntable of a record player comprising a motor mounting plate having a resilient suspension from a supporting surface, a drive motor mounted on said plate and having its shaft extending therefrom, a drive member carried on the extending portion of said motor shaft, a diaphragm support member disposed adjacent said plate and mounted for rotation thereon, a first flexible diaphragm supported by said diaphragm support member and disposed transverse to the axis of said member, a rigid torque-transmitting member extending centrally from said first diaphragm, a second flexible diaphragm attached to said torque transmitting member, drive wheel supporting means carried by said second diaphragm, a drive wheel carried by said supporting means and adapted to have driving engagement with the record player turntable, an idler wheel mounted for rotary movement on said motor plate and adapted to simultaneously engage said drive member and said diaphragm support member, whereby torque is transmitted from said motor drive shaft to said drive wheel with said diaphragms functioning to isolate said drive wheel from vibration both parallel to and transverse to the axis of rotation of said diaphragm support member.

5. A low rumble motor assembly adapted to drive the turntable of a record player comprising a motor, a cup-shaped member supported for rotation adjacent said motor, a first flexible diaphragm supported at its periphery within said cup-shaped member, a torque-transmitting member extending centrally from said first diaphragm, a second flexible diaphragm attached to said torque-transmitting member, a drive wheel attached to said second diaphragm and rotatable therewith, said drive wheel being adapted for driving engagement with the record player turntable, and means for rotatably coupling said motor to said cup-shaped member whereby torque is transmitted to said drive wheel with said diaphragms functioning to isolate said drive wheel from vibratory motions of said motor.

6. A low rumble motor assembly adapted to drive the turntable of a record player comprising a motor, a drive element supported for rotation adjacent said motor, a first flexible diaphragm supported at its periphery on said drive element, a torque transmitting member extending from said first diaphragm, a second flexible diaphragm attached to said torque-transmitting member, a drive wheel attached to said second diaphragm and rotatable therewith, said drive wheel being adapted for driving engagement with the record player turntable, and means for rotatably coupling said motor to said drive element whereby torque is transmitted to said drive wheel with said diaphragms functioning to isolate said drive wheel from vibratory motions of said motor.

7. A low rumble motor assembly adapted to drive the turntable of a record player comprising a motor, a drive element supported for rotation adjacent said motor, a first flexible diaphragm supported by said drive element, a torque-transmitting member extending from said first diaphragm, a second flexible diaphragm attached to said torque-transmitting member, turntable drive means attached to said second diaphragm and rotatable therewith, and means for rotatably coupling said motor to said drive element whereby torque is transmitted to said turntable drive means with said diaphragms functioning to isolate said drive means from vibratory motions of said motor.

8. A mechanism for driving a machine, comprising a driving means in the form of a stepped shaft, an idler wheel mounted for movement into and out of engagement with said shaft, a wheel member mounted for engagement with said idler wheel simultaneously with engagement of said idler wheel with said shaft, a driven member, torque transmitting means coupled to and between said wheel member and said driven member, said means including a thin flexible member carried by said wheel member and rotatable thereby, said flexible member having appreciable resistance only to shearing stress applied in a direction transverse to its action of rotation, whereby said driven member is isolated from vibration originating at said driving means.

9. A vibration isolating, torque-transmitting coupling comprising a driving means having a plurality of axially displaced operating positions, a wheel member in peripheral driving engagement with said driving means in each of its operating positions, a driven member, torque-transmitting means between said wheel member and said driven member, said means including two rotationally attached flexible members, one of said flexible members being carried by said wheel member and rotatable thereby, the other of said flexible members being connected to said driven member, said flexible members having appreciable resistance only to shearing stress applied in a direction transverse to their axis of rotation, whereby said driven member is isolated from vibration originating at said driving means.

10. A vibration isolating, torque-transmitting coupling comprising a driving means having a plurality of axially displaced driving positions, a wheel member in peripheral engagement with said driving means in each of its driving positions, a driven member, torque-transmitting means between said wheel member and said driven member, said wheel including a flexible diaphragm rotatable on an axis transverse to the plane of the diaphragm, and means connecting said diaphragm with said driven member, said diaphragm having appreciable resistance only to shearing stress applied in a direction transverse to its axis of rotation, whereby said driven member is isolated from vibration originating at said driving means.

11. A vibration isolating, torque-transmitting coupling comprising a driving means, a wheel member in peripheral engagement with said driving means, a driven member, torque-transmitting means coupled to and between said wheel member and said driven member, said means including a thin, flexible member carried by said wheel member and rotatable thereby, said flexible member having appreciable resistance only to shearing stress applied in a direction transverse to its axis of rotation, whereby said driven member is isolated from vibration originating at said driving means.

References Cited in the file of this patent

UNITED STATES PATENTS

| | | |
|---|---|---|
| 539,161 | Almond | May 14, 1895 |
| 1,045,791 | Hodge | Nov. 26, 1912 |
| 1,145,602 | Lieber | July 6, 1915 |
| 1,360,555 | MacDonald | Nov. 30, 1920 |
| 1,445,272 | Gill | Feb. 13, 1923 |
| 1,466,238 | MacDonald | Aug. 28, 1923 |
| 1,947,052 | Lack | Feb. 13, 1934 |
| 2,878,689 | Aebersold | Mar. 24, 1959 |

FOREIGN PATENTS

| | | |
|---|---|---|
| 27,712 | Great Britain | Nov. 19, 1903 |